2 Sheets—Sheet 1.
J. BATTY,
Assignor to A. BATTY.
The Arrangement of Apparatus for and Process of Forming Laps.
No. 9,413. Reissued Oct. 12, 1880.
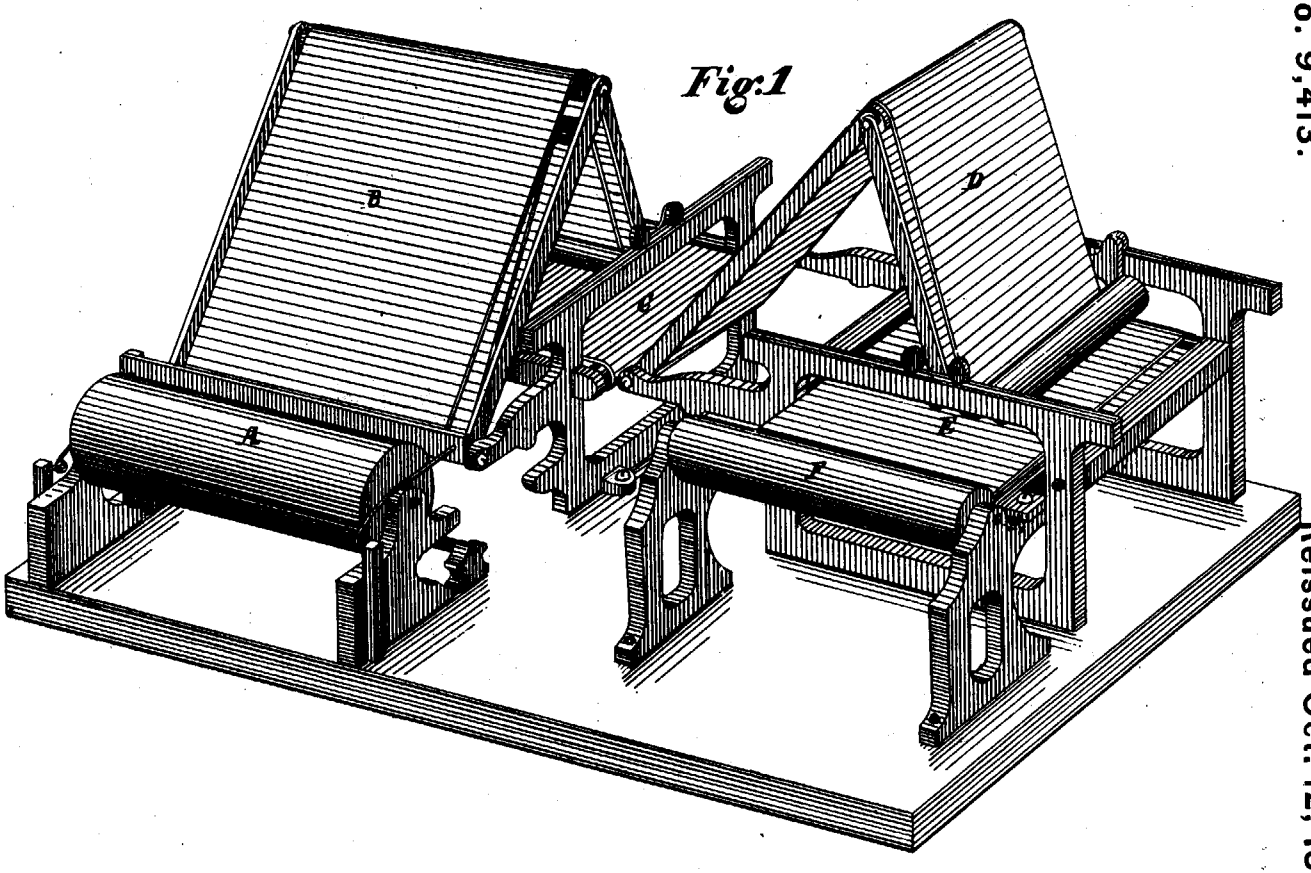
*Witnesses:*
Francis Lerline
Henry V. Buckley
*Inventor.*
Job Batty
per George E. Buckley
atty.
N. PETERS, PHOTO-LITHOGRAPHER, WASHINGTON, D. C.

2 Sheets—Sheet 2.
J. BATTY,
Assignor to A. BATTY.
The Arrangement of Apparatus for and Process of Forming Laps.
No. 9,413. Reissued Oct. 12, 1880.
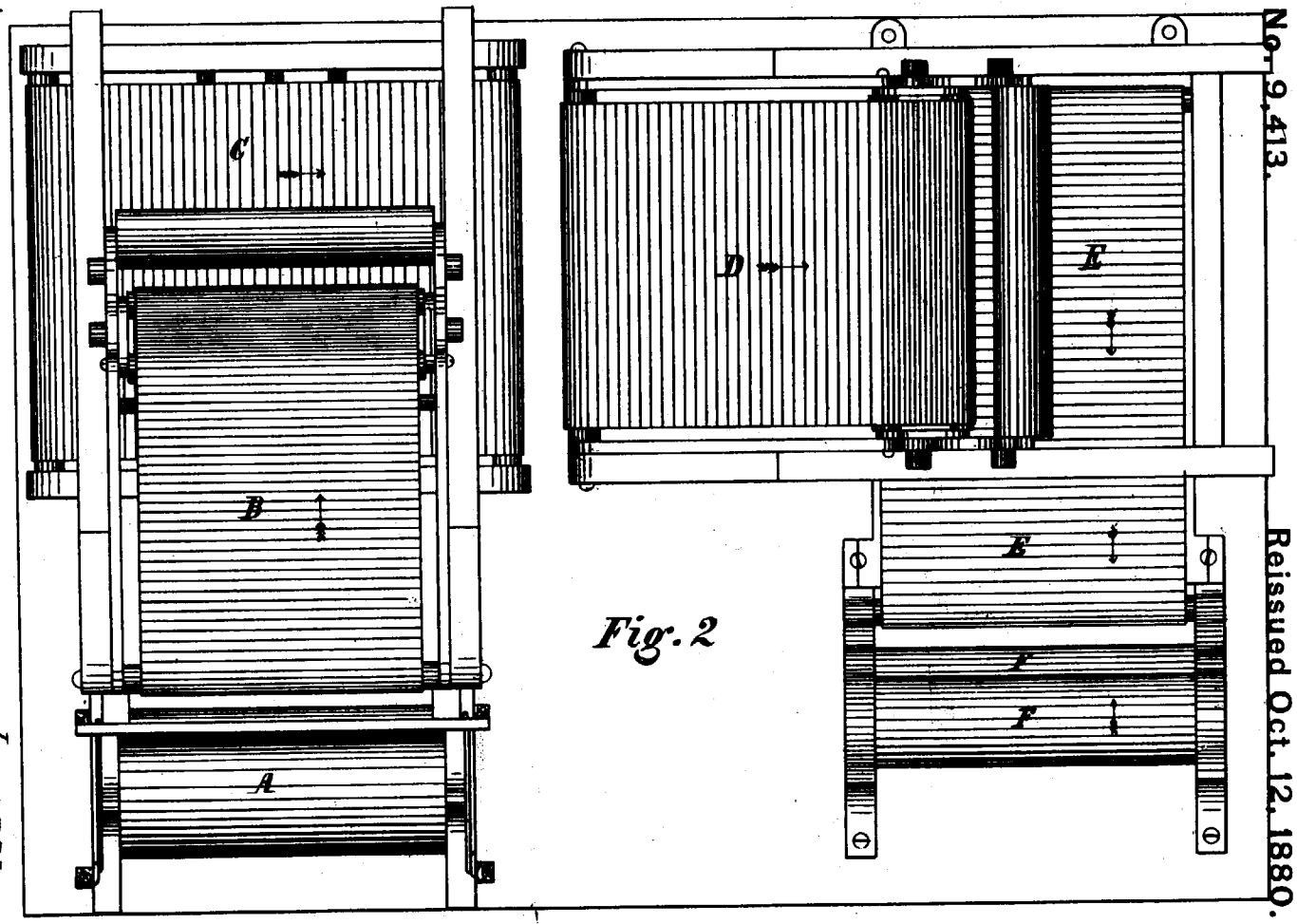
WITNESSES:
Francis Lelline
Henry V. Buckley
INVENTOR.
Job Batty
per George E. Buckley
atty.
N. PETERS, PHOTO-LITHOGRAPHER, WASHINGTON, D. C.

UNITED STATES PATENT OFFICE.

JOB BATTY, OF PHILADELPHIA, PA., ASSIGNOR TO ALBERT BATTY.

ARRANGEMENT OF APPARATUS FOR AND PROCESS OF FORMING LAPS.

SPECIFICATION forming part of Reissued Letters Patent No. 9,413, dated October 12, 1880.

Original No. 188,495, dated March 20, 1877. Application for reissue filed June 1, 1878.

*To all whom it may concern:*

Be it known that I, JOB BATTY, of the city and county of Philadelphia, State of Pennsylvania, did invent certain new and useful Improvements in the Arrangement of Apparatus for and Processes of Forming Laps; and I do hereby declare the following to be a full, clear, and exact description of the same, reference being had to the annexed drawings, which represent an arrangement of machinery in which my invention can be practiced, and which drawings make a part hereof.

My invention relates to that part of the process of making yarn which is practiced in the class of machines known in the arts as "lap-machines," which receive the lap—say, of wool—after its treatment in a breaking carding-engine, and after lapping or doubling it several times in such a way as to make an even lap, deliver it for subsequent treatment in a condensing carding-engine, sometimes called a "finisher-card," by the arrangement of machines shown in the drawings. The operation of receiving the lap from the breaker, passing it through the lap-machines, and delivering it to the condenser can be carried on continuously.

The design of the invention is to prepare the lap, after doubling, for its subsequent treatment in the condenser in such a way that the fibers composing the lap lie in the general direction of the length of the lap. I say "general direction" because some fibers will lie crosswise, or partially so; but the general direction in which the large majority of them will lie will be in that of the length of the lap. When this lap is fed to the condenser the fibers will enter it lengthwise, or end first, and will result in making more even, finer, and stronger yarn than when the fibers enter the condenser sidewise.

My invention also relates to the arrangement of apparatus to practice this process.

In the drawings, A represents the doffer of a first card. B and C are endless slat-aprons upon the first lap-machine. D and E are endless slat-aprons upon the second lap-machine. F F are the receiving or feed rolls of the second card.

The operation is as follows: A carding-machine, called a "breaker," is located at A. The apron B receives the lap from doffer A and slowly carries it forward and deposits it, layer upon layer, backward and forward upon apron C. As the lap comes from the doffer A its fibers are endwise. They consequently lie sidewise to the direction of the motion of apron C when deposited there. This apron C then carries the lap forward and delivers it, with its fibers still sidewise, upon apron D, which, in turn, deposits it upon apron E, with its fibers pointing toward card or condenser F.

F F are the two feed-rolls of the condenser-card.

The lap and carding machines used by me are the well-known endless-lap and carding machines in common use, and I do not claim to have made any improvement in their construction.

Two breaker-cards may be used instead of a breaker and a condenser card.

The object of my invention is to get all the evenness of lap which is attained by passing the lap from the breaker through two lap-machines, and at the same time secure the advantage of delivering it to the receiving-card, with the fibers composing it endwise, so that the yarn drawn from it may, through its fibers being lengthwise, be stronger. In this way I obtain a very strong and even yarn from very short fiber, and a better yarn at all times than when the fibers of the lap enter the second card, be it breaker or condenser, sidewise.

The aprons B and D may be denominated "doublers," for the sake of distinction.

The special construction and operation of these machines are well known to all skilled in the arts in which they are used.

Having thus described my invention, what I claim as new, and desire to secure by Letters Patent, is—

1. The combination, with a breaker and a finisher card, of a series of endless aprons and doublers, arranged substantially as described, whereby the fibers composing the lap are taken from the doffer of the breaker endwise, doubled and redoubled, and then fed to the finisher in a sheet, with the fibers entering the finisher endwise, as and for the purpose set forth.

2. The improvement in the art of forming laps upon lapping-machines, which consists in taking the web lengthwise of the fiber as it leaves the breaker-card, then, as it is carried forward, doubling the forward end of this single thickness of web sidewise or transversely continuously, then again continuously doubling sidewise or transversely the forward end of the increased thickness of web thus formed, whereby, after two doublings, the finished lap is fitted to enter the condensing-card with its fibers lengthwise, or nearly so, substantially as above set forth.

JOB BATTY.

Witnesses:
BENJAMIN KAY,
GEORGE E. BUCKLEY.